April 18, 1967 W. TINLIN 3,314,724
TUNNELING MACHINE AND IMPACT-TOOL CUTTING HEAD THEREFOR
Filed April 17, 1964 4 Sheets-Sheet 2
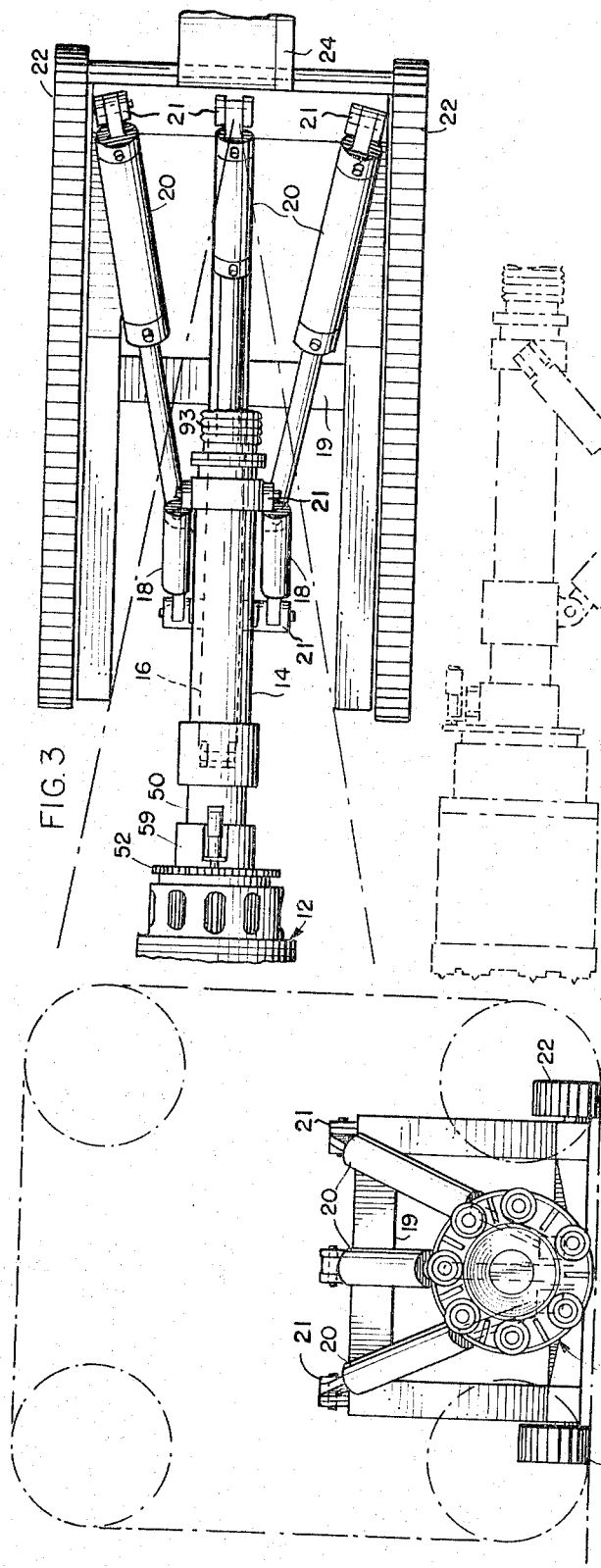
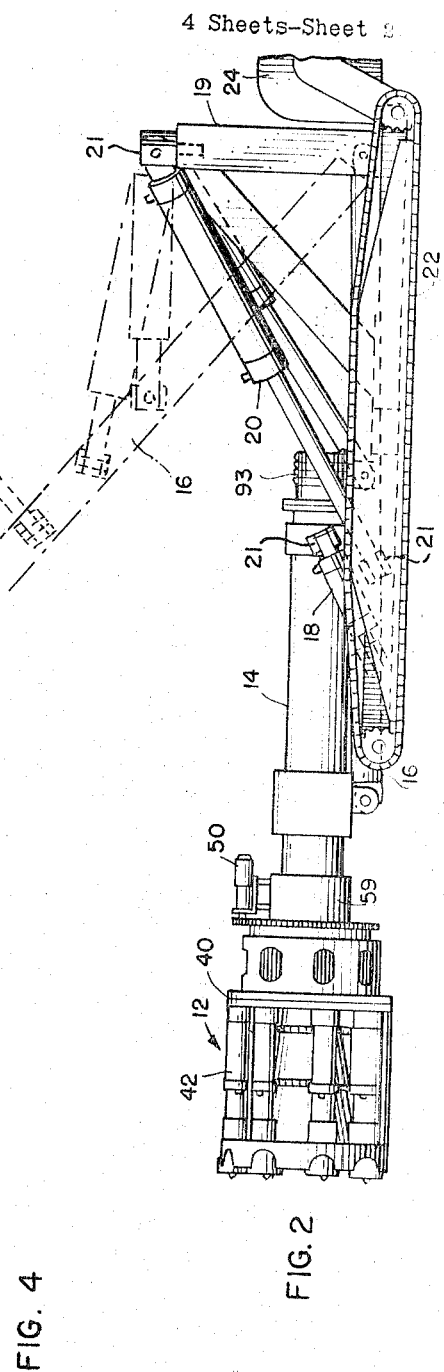
INVENTOR:
WILLIAM TINLIN
BY
Rummler and Snow
ATT'YS

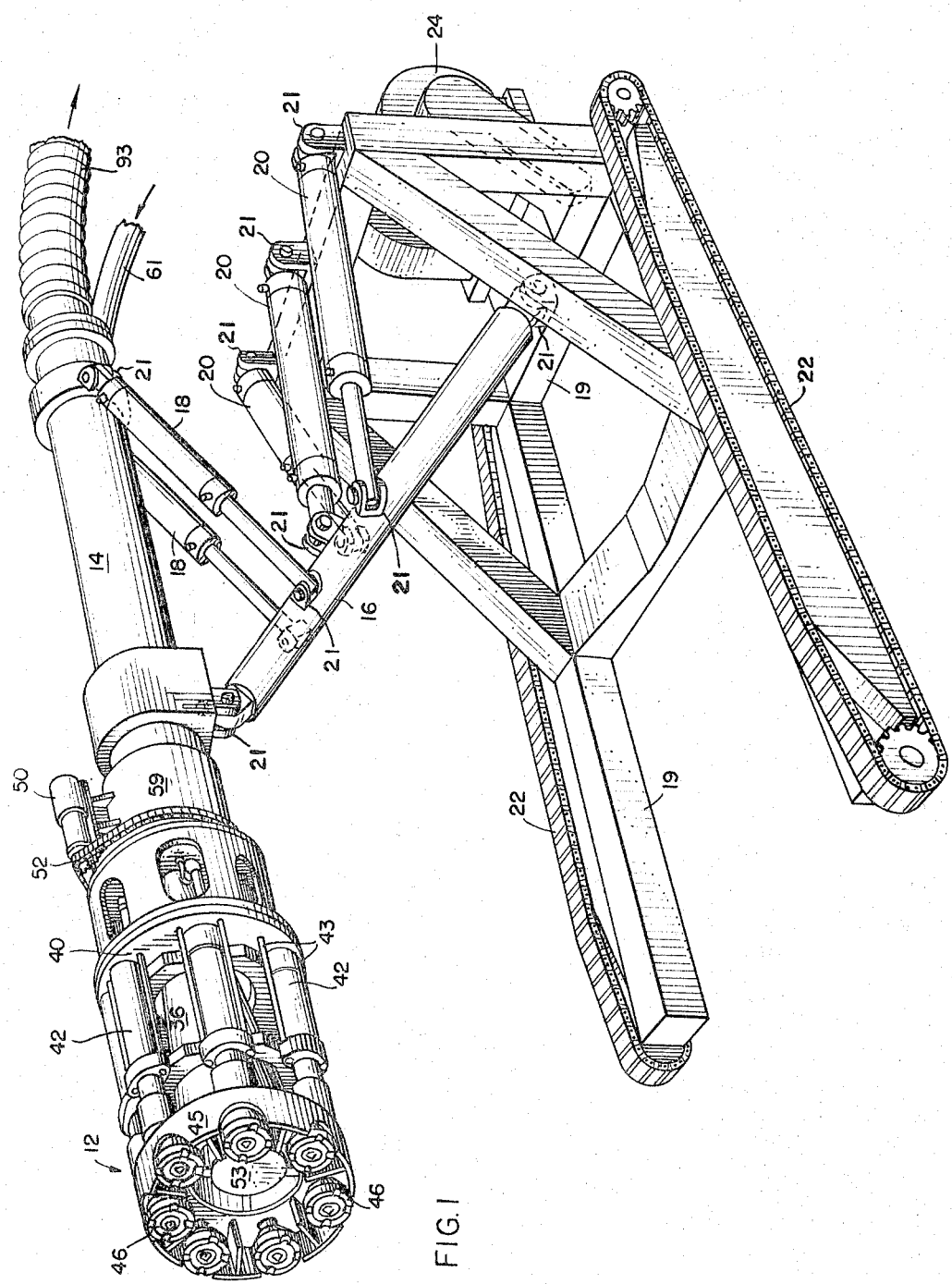

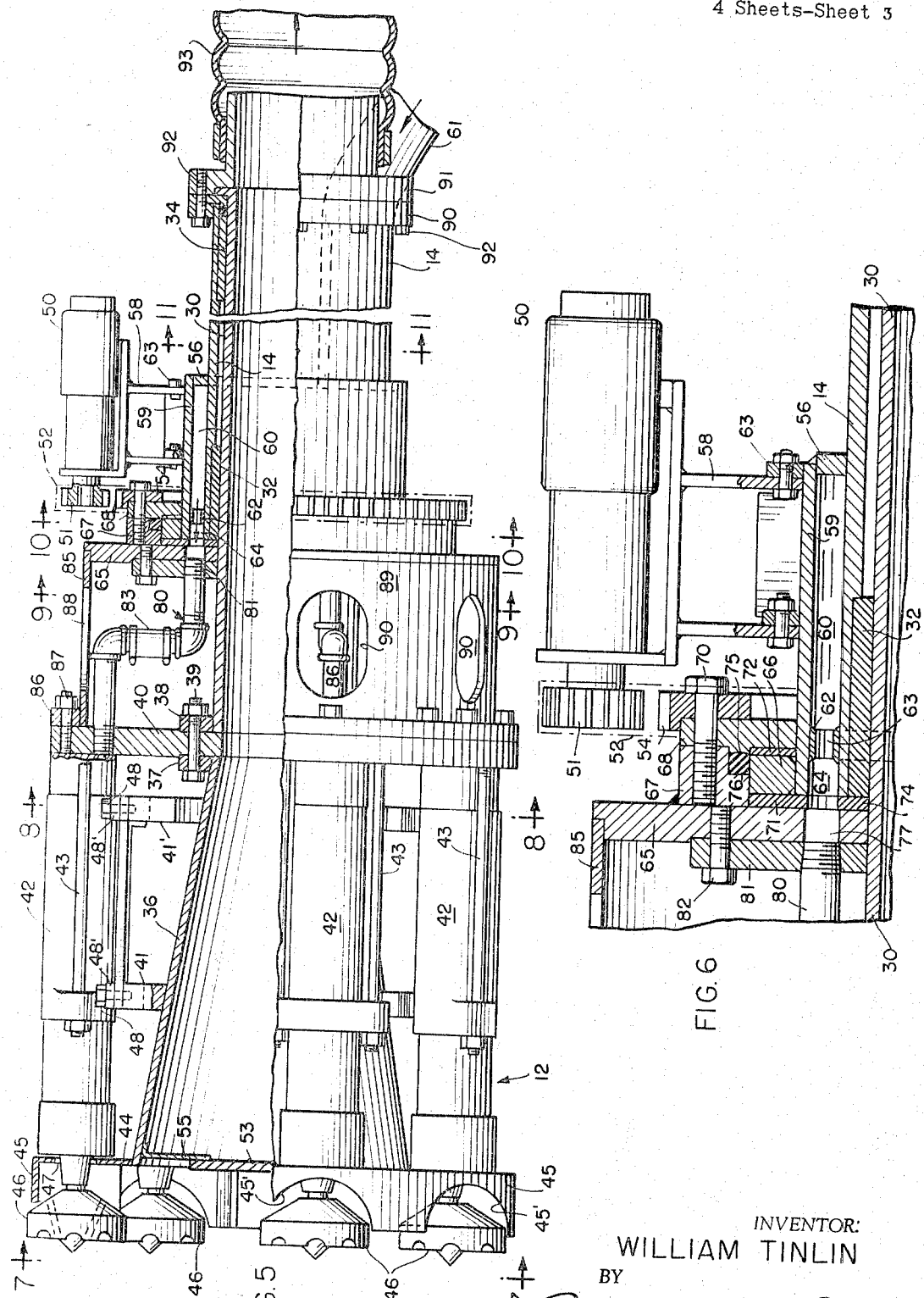

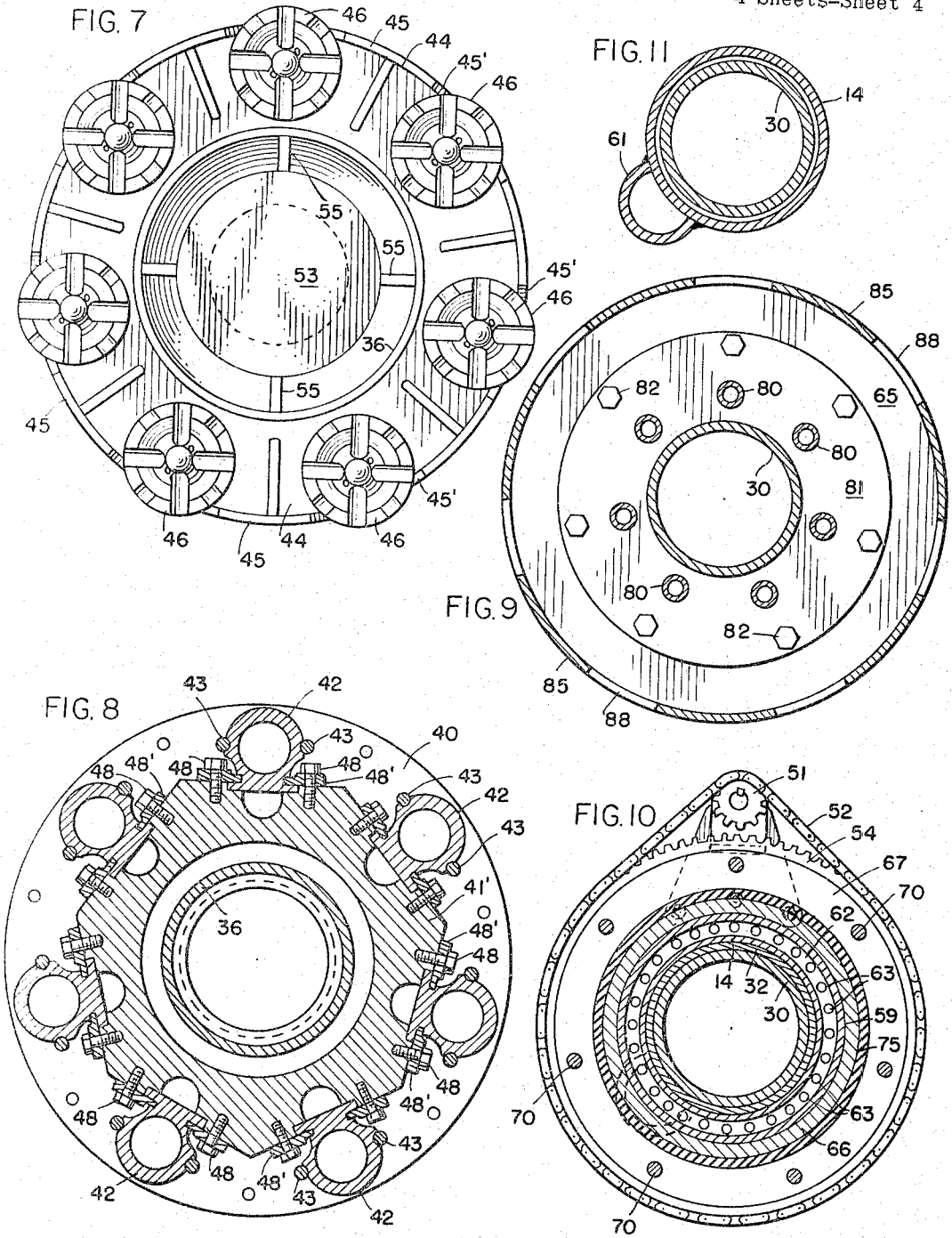

United States Patent Office 3,314,724
Patented Apr. 18, 1967

3,314,724
TUNNELING MACHINE AND IMPACT-TOOL CUTTING HEAD THEREFOR
William Tinlin, 21 Hickory St., Chicago Heights, Ill. 60411
Filed Apr. 17, 1964, Ser. No. 360,585
10 Claims. (Cl. 299—62)

This invention relates to improvements in tunneling machines in general, and more particularly, to improvements in such machines as that disclosed in my United States Patent No. 3,005,627 for tunneling into rock to form a relatively smooth walled bore of substantially any length, and which may be remotely controlled from the mouth of the tunnel.

The objects of this invention are to provide an improved machine for tunneling into solid rock; to provide such a machine that is automatic in its operation; to provide such a machine that will automatically remove its cuttings from the tunnel face at almost the instant that they are formed; to provide such a machine that will automatically deliver and discharge the cuttings to the tunnel mouth; to provide such a machine with which the cuttings are of relatively small granular form for easy removal from the tunnel face and conveyance to the tunnel mouth; to provide such a machine which may be remotely controlled from the tunnel mouth for both direction of the tunnel bore and speed of operation; to provide an improved tunneling machine whereby the character of material being worked or tunneled into can be continuously determined from the tunnel mouth; to provide such a machine wherein the individual cutting tools will remain sharp longer and have an increased useful life; to provide such a machine which will permit quick and easy removal and replacement of the cutting tool actuators without the need of removing shrouding from the machine and without a large retraction from the tunnel face; and to provide an improved rock tunneling machine that is self-propelled, substantially automatic in its operation, and which will form a clean bore of substantially any length without the need of manual labor within the tunnel.

Various other objects and advantages will appear from the following description of one embodiment of this invention as shown in the accompanying drawings, in which:

FIGURE 1 is a perspective view of an improved tunneling machine;

FIG. 2 is a side elevational view of the same showing the work head in its lower-most position, and showing, in broken lines, the work head in a raised position;

FIG. 3 is a top plan view of the machine with the work head in its centered position, and showing, in broken lines, the extreme right and left positions of the work head boom or carrier arm;

FIG. 4 is a front elevational view of the machine with the work head in its lower-most and centered position, and showing, in broken lines, the outline of the work head in its extreme position on the boom or carrier arm and illustrating the outline of the cross-sectional area of the bore the machine is capable of cutting;

FIG. 5 is a side elevational view of the work head, partly in section, and showing the rotary drive means for the work head and the suction tube for removal of cuttings from the tunnel face;

FIG. 6 is an enlarged sectional view of a portion of FIG. 5 showing the details of the connection between the rotatable work head and the stationary support means therefor;

FIG. 7 is a front view of the work head taken on line 7—7 of FIG. 5;

FIG. 8 is a cross-sectional view of the work head taken on line 8—8 of FIG. 5;

FIG. 9 is a cross-sectional view taken on line 9—9 of FIG. 5;

FIG. 10 is a cross-sectional view of the rearward position of the work head, taken on line 10—10 of FIG. 5; and FIG. 11 is a cross-sectional view of the suction tube and air supply conduit, taken on line 11—11 of FIG. 5.

The essential concept of this invention is to provide a rock tunneling machine having a rotatable or rotatably oscillating work head on which is mounted a plurality of rock cutting tools actuated by impact hammers, e.g. electric or hydraulic, and arranged around the periphery of the work head, a suction chamber being formed on the interior of the work head substantially co-axial therewith and arranged to draw air from the periphery of the work head across the cutting surfaces of the cutting tool. The chamber is connected to and communicates with a suction tube which also serves as a support or tail stock for the work head and a supply of air enters the chamber from adjacent the outer perimeter of the work head, flowing across the faces of the cutting tools toward the center of the work head and thence into the chamber. A baffle plate is attached to the outer end of the chamber adjacent the cutting tools for restricting the open end of the chamber so that the air velocity past the tool points is relatively high.

The high velocity of the air will entrain all of the cuttings and debris in the air stream as it flows into the chamber and in addition to collecting and evacuating the cuttings, the high velocity of the air will promote efficient transfer of heat from the tool points, thereby maintaining the tool points at a low operating temperature. Since the life of the tool points or cutters is dependent on the temperature, i.e. the lower the temperature the longer the tool point will remain sharp, the flow of air across the impact surfaces will promote a greatly increased useful life for each tool point. Another advantage of placing the chamber on the interior of the work head, rather than enclosing the entire head with a shroud, is that the impact devices or hammers are readily accessible. Thus, in the event one of the hammers should become defective, it can be quickly and easily replaced by a workman standing adjacent to the side of the work head, thus eliminating the need for removal of shrouding from the machine and the need for backing the machine from the tunnel. The amount of down time, or time during which the machine is not cutting, is thereby kept at a minimum.

Tunneling machines employing impact type hammers actuating cutting tools mounted on a rotatable or oscillating head are, generally speaking, known in the art, and it has been proposed, heretofore, to remove the cuttings from the tunnel face by an air suction exhaust system located generally on the axis of a revolving work head carrying a plurality of cutting elements. A primary difficulty with these prior machines, however, lies in the fact that the air had to enter the exhaust system between closely spaced impact hammers which created a high resistance and impedance to the flow cuttings. Also these prior machines encased the impact hammers in a shroud making them inaccessible except by removal of the machine from the tunnel bore. The present invention is intended to overcome these difficulties and provide a more efficient and more versatile tunneling machine.

In the form shown in the drawings, the improved tunneling machine comprises a work head 12 rotatably mounted on an elongate tubular frame member or tailstock 14 which is pivotally attached to a boom arm 16. The boom arm 16 is pivotally attached to vehicular frame member 19. A pair of hydraulic cylinders 18 are pivotally connected between the boom arm 16 and the frame member 14 at a point rearwardly of the pivotal attachment of the frame member to the boom arm. Selective extension and retraction of the cylinders 18 permit the longitudinal centerline of the work head to be positioned perpendicular to the tunnel face. Three other hydraulic cylinders 20 are pivotally attached between the boom arm 16 and the vehicular frame 19 at laterally spaced points, each attachment being by means of a pivotedly mounted clevis 21. The means attaching the hydraulic cylinders 18 to the frame member 14 and the boom arm 16, as well as the connection of the boom arm to the frame member, is in each instance a pivotedly mounted clevis. Selective extension and retraction of these three cylinders 20 permit the work head 12 to be moved left and right, and to be raised and lowered, as shown in FIGS. 2-4. The vehicular frame 19 is mounted on a pair of endless tracks 22 driven by a motor 24 for advancing or retracting the work head 12.

The workhead 12 comprises an elongate hollow cylindrical stem member 30 rotatably mounted in the frame member or tail-stock 14 on bronze bearings 32 and 34 located adjacent the ends thereof. An enlarged cone-shaped chamber 36 is attached to the forward end of the stem 30 by means of the bolts 39 secured through the flanges 37 and 38 formed on the chamber 36 and the stem 30 respectively. A main support ring or plate 40 is positioned between the flanges 37 and 38 and retained in assembled relation by the bolts 39 and a pair of ring-like hammer support members 41 and 41' are disposed in axially spaced radially projecting relation with the chamber 36. The support ring 41 is directly attached to the wall of the chamber 36 and is in the form of a polygon having equi-angularly spaced sides equal in number to the number of hammers employed. The support ring 41' is a spacer element and has the same shape as the support ring 41, the ring 41' serving to tie together the rearward ends of the impact hammers 42 which are secured to support rings 41 and 41' by the bolts 48 and gib plates 48'. Because the main forces created by the impact hammers 42 are longitudinal, additional securing means are provided in the form of tie rods 43 which connect the hammers to the main support flange 40. The rods 43 extend parallel to the longitudinal axis of the hammers 42 and hold them tightly against the flange 40, thereby assuring no longitudinal movement of the hammers relative to the chamber 36 and the support rings 41-41'.

An annular ring-like member 44 is secured to the forward or open end of the chamber 36 and extends radially outwardly therefrom to terminate in a forwardly extending collar or shroud 45. The openings 47 are provided in the ring 44 to permit the shanks of cutting tools or bits 46 to be inserted into the hammers 42. The collar 45 is of a diameter slightly less than the diameter of the path of the tools 46 as they rotate about the axis of the chamber 36, i.e. 35 inches for a 36 inch work head, and is of a length to overlap the tools to a distance of about one-half inch of their impacting position. Hence notches 45' are formed in the forward edge of the collar 45, which notches are complementary with the shape of and positioned to clear the peripheral portion of each tool 46. The depth of the notches 45' is sufficient to fully clear the rear surface of the tool as it is moved to its fully retracted position, and the length of the collar 45 is preferably sufficient to position the shroud close to the tunnel face when the tools are fully extended by the impact hammers, as shown in FIG. 5, but is not so long that the shroud 44 would contact the tunnel face when the tools 46 are fully retracted. This arrangement assures that the flow of air into the chamber 36 will be across the cutting face or point of each tool, maintaining it at a low temperature, and of sufficient velocity that the chips or cuttings produced by the action of the impact hammers and tools will be quickly and efficiently evacuated from the tunnel face.

It should also be noted that because the collar 45 is short, extending forwardly only from the forward edge of the chamber 36, and surrounds only the cutting tool bits, the fastening means, i.e. the bolts 48 and the nuts securing the rods 43 to the main support ring 40 and the hammers 42, are readily accessible. Replacement of a defective hammer is therefore a simple matter.

A circular plate 53, as best seen in FIGS. 5 and 7, is secured in the open end of the chamber 36 by means of the bars or lugs 55. The plate 53 is positioned concentric with the circular open end of the chamber 36 so that the radial distance between the edge of the plate and the chamber is uniform. Preferably, the total area of the opening between the plate and the chamber wall is equal to the area of the front end opening in the hollow stem 30. This relationship of areas insures that the velocity of air past the tools will be substantially the same as the air velocity within the stem 30.

The stem 30 and the work head 12 are integrally connected by the main support plate 40 and the assembly is rotated by a motor 50 having a spur gear 51 attached thereto which gear by means of a chain 52 drives a ring gear 54, secured to the stem 30 by means of a gland arrangement to be described.

The motor 50 is mounted on a platform structure 58 which, in turn, is bolted onto flanges 63 welded onto the outer surface of an annular collar 59 surrounding the frame 14 in radially spaced relation and supported on a flange-like ring 56. The ring 56 is welded or otherwise bonded to the collar 59 and frame 14 to form one end of a pressure tight plenum 60 which communicates directly with a compressed air supply conduit 61, see FIGS. 5 and 11, which is formed integrally on the exterior of the frame 14 and extends forwardly therealong from the rear end of the frame. A second support ring 62 is provided adjacent the other end of the collar 59 and is suitably secured between the collar and frame to provide support for the collar and, as shown, this ring 62 is formed with a plurality of angularly spaced holes 63 which provide communication with a continuous annular channel 64 for a purpose to be hereafter explained.

As shown in FIGS. 5 and 6, the assembly of the work head 12 and the stem 30 is supported for rotation in the frame 14 by the bronze bushings or bearings 32 and 34 and the said assembly is secured against axial or longitudinal movement relative to the frame 14 by means of the before mentioned gland arrangement which mounts the ring gear 54. As will be seen from FIGS. 5 and 6, this gland arrangement is constructed on an annualr end plate 65 which is welded onto the stem 30 and projects radially therefrom at a position to substantially abut the forward end of the collar 59 which forms the plenum 60. As shown, a bearing ring 66, preferably of steel, encircles the forward end of the collar 59, and is welded thereto, to provide the means for connecting the rotary and stationary parts. As shown, this connection is made by means of a spacer ring 67, encircling the bearing ring 66 and having an inside diameter formed to provide a running fit on the bearing ring, and a clamp ring 68 which extends radially from the collar 59 to the outer periphery of the spacer ring 67. The ring gear 54 is disposed on the rearward face of the clamp ring 68, so as to project radially beyond its periphery and the three elements 67, 68 and 54 are rigidly secured together by means of a plurality of angularly spaced bolts 70 which are threaded into suitably tapped bores in the spacer ring 67. The spacer ring 67 is welded onto the rearward face of the end plate 65 and thus a driving connection between the ring gear 54 and the end plate 65 is effected.

In order to provide bearing for axial thrust between the rotary and stationary parts, a flat bearing ring 71, of bronze, is disposed between the rearward face of the end plate 65 and the forward end surfaces of the main bearing ring 66 and the collar 59. Also a flat bearing ring 72 is disposed between the rearward face of the main bearing ring 66 and the clamp ring 68. This gland and thrust bearing arrangement is sealed against leakage of compressed air from the plenum 60 by means of a ring 74, disposed between the end plate 65 and the end surfaces of the bearing 32 and frame 14, and a gasket or sealing ring 75 disposed between the spacer ring 67 and the clamp ring 68. The sealing ring 75 is preferably of a soft resilient sealing material, such as "neoprene," and is held in tight surrounding relation with the main bearing ring 66 by means of a compression rib, formed on the forward face of the clamp ring 68, and projecting into a rabbeted channel 76 formed at the inner rearward margin of the clamp ring. The sealing ring 74 is radially separated from the bearing ring 71 so as to leave a clear space for passage of air from the plenum 60 to a series of angularly spaced bores 77 in the end plate 65.

In the work head construction illustrated in the drawings, the impact hammers for driving the cutters or bits are of the pneumatic or air actuated type and it is to supply these hammers with compressed air that the plenum 60 and supply conduit 61 are provided. As shown each hammer 42 is individually connected with the plenum 60 by means of a conduit 80 which leads from a respective bore 77 in the end plate 65 to the hammer by way of a suitable passage through the main hammer support plate 40. As shown in FIG. 5, each of the conduits 80 comprises a pair of pipe fittings one of which is threaded into a respective passage in the support plate 40 and the other of which is threaded into a suitably tapped bore extending through a mounting plate 81 which, by bolts 82, is mounted on the forward face of the end plate 65 with its bores in registry with the openings 77 in the end plate. The fittings comprising the conduits 80 are preferably connected together by a flexible coupling 83 to avoid transmission of vibration from one end of the conduit to the other.

The space between the hammer support plate 40 and the end plate 65 is preferably enclosed by an annular, or ring-like cover plate 85 in order to protect the conduits 80, the cover plate having an integral radial flange 86, at its forward end, by means of which the cover plate is secured to the hammer support plate 40 by suitable bolts 87. For inspection purposes, angularly spaced "hand-holes" 88 are provided in the cover plate 85 opposite each conduit 80.

At this point it will be understood that when the work head 12 is rotated by the motor 50, the tail-piece 30 turning in the stationary frame 14, the conduits 80 are in constant communication with the plenum 60 because of the annularly continuous channel 64 into which the passages 77 of the end plate 65 open. Thus, as long as the plenum 60 is supplied with compressed air the hammers be likewise supplied, regardless of the angular position of the rotary part relative to the stationary part of the apparatus. The flow of compressed air to the plenum 60, and hence the operation of the hammers, will be controlled by valve means, not shown, disposed in the air supply line leading to the conduit 61.

As shown, the rear end of the frame member 14 is provided with a radial flange 90 onto which a flanged hose coupling 91 is mounted, by bolts 92, and a flexible hose-like conduit 93 is attached to the coupling 92 for connection with a suitable exhaust fan, not shown, for applying suction to the hollow stem 30 and the cone-like chamber 36.

In operation the motor 50 rotates the work head 12 and air under pressure is supplied to the hammers 42, by way of the plenum 60 and supply conduits 61 and 80. At the same time a suction is applied to the hollow stem 30 and air from around the work head 12 is drawn over the forward edges of the shroud 45, across the faces of the bits 46 and into the chamber 36. Then the work head is urged toward the tunnel face, not shown, and as the cutters or bits are impacted against the tunnel face, thereby chipping and breaking away the rock material into which the tunnel is to be cut, the cuttings are immediately picked up by the air entering the chamber 36 and are carried thereby, through the stem 30 and flexible conduit 93, to the tunnel mouth where the cuttings may be collected by suitable means for disposal.

From the foregoing it will now be understood that as the cutters or bits are impacted against the tunnel face the high velocity flow of air over the edge of the shroud 45 and across the faces of the cutters 46 not only affords immediate removal of the cuttings as they are formed, thereby maintaining a constantly clean tunnel bore, but also provides a continuous cooling means whereby the bits, or cutter points, are kept at a relatively low temperature to ensure a greatly increased tool life. It is well known that in rock cutting work tool life is quite short, the bits or cutters rapidly heating to the point where temper is lost and break-down of the cutting edges occurs. With the work head of the present invention the cutting bits maintain their service ability, under continuous working, for many times the life of bits operated in the conventional manner.

It will also be understood that the improved work head may be operated either as a drill for forming cylindrical bores, of the diameter of the cutter path generated by simple rotation of the work head, such as in caisson work, or the work head may be traversed laterally over a predetermined path by a suitable carrier and traversing mechanism like that shown, for example, in FIG. 1 to form tunnels of a size larger than the work head diameter.

Although but one specific embodiment of this invention has been herein shown and described it will be understood that numerous details of the construction shown may be altered or omitted without departing from the spirit of the invention as defined by the following claims.

I claim:

1. A work head for a tunneling machine comprising; a rotatably mounted hollow tube having an enlarged forward portion, a plurality of impact hammers attached around the periphery of said forward portion, a cutting tool detachably retained in each of said impact hammers, and a shroud mounted at the open end of said enlarged forward portion and extending radially and then axially forward therefrom to surround said cutting tools, said shroud being of less diameter than the outer periphery of the path of said cutting tools during rotation of said hollow tube and having portions of its forwardly extending parts removed to provide a notch opposite each tool to permit lateral projection of a peripheral portion thereof therethrough.

2. A work head according to claim 1 wherein the shroud is attached to the forward edge of said enlarged forward portion and has a wall portion projecting radially therefrom and a flange-like cylindrical portion for surrounding said tools, said cylindrical portion extending forwardly from the wall portion a lesser distance than the maximum projection of said tools beyond said wall portion.

3. A work head according to claim 1 wherein a baffle plate is positioned within the open end of said enlarged portion, said plate being of a size such that the area between its edges and the periphery of said open end is substantially the same as the area of the cross-section of said tube.

4. A work head for a tunneling machine comprising, a rotatably mounted tube-like stem having an enlarged hollow forward portion, said forward portion having a substantially circular open front end and opening rearwardly into said stem, a plurality of impact hammers each having a cutting tool releasably retained therein arranged around the exterior of said enlarged portion substantially parallel with the axis thereof, said cutting tools projecting beyond the open end of said forward portion and extending radially with respect to the center thereof beyond the maximum radial dimension of said impact hammers, the centers of said cutting tools defining a circle concentric with said open front end, means for releasably securing each of said impact hammers to said enlarged forward portion, frame means carrying and surrounding said stem immediately behind said enlarged forward portion for rotatably supporting said stem and enlarged forward portion, means for rotating said stem in said frame means, a shroud secured to said forward portion for surrounding said cutting tools and directing flow of air across the faces of said tools when said work head is in operating position and a suction is applied to said stem, and a circular plate mounted concentrically within the open end of said enlarged forward portion, said plate being of a size to reduce the open area of said forward portion to substantially that of the cross-section of said stem.

5. A work head for a tunneling machine comprising, a rotatably mounted tube-like stem having an enlarged hollow forward portion, said forward portion having a substantially circular front open end and opening rearwardly into said stem, a plurality of impact hammers each having a cutting tool releasably retained therein arranged around the exterior of said enlarged portion substantially parallel with the axis thereof, the centers of said cutting tools defining a circle concentric with said circular front end, means for releasably securing each of said impact hammers to said enlarged forward portion, frame means carrying and surrounding said stem immediately behind said enlarged forward portion for rotatably supporting said stem and enlarged forward portion, means for rotating said stem in said frame means, means providing a plenum surrounding the forward end of said frame means and an annular gland connection between the enlarged forward portion and the adjacent end of said frame means, said plenum opening into a continuous annular forwardly facing channel, an air supply conduit for each of said hammers opening into said channel through an end wall on said enlarged forward portion, the movable part of said gland connection being mounted on said end wall to enclose said channel, and means for supplying compressed air to said plenum for actuating said hammers.

6. A work head for a tunneling machine comprising a rotatably mounted tube, an enlarged axially extending chamber formed concentrically on one end of said tube for rotation therewith, a plurality of impact hammers secured to the exterior of said enlarged chamber and arranged in a substantially circular pattern about the axis thereof, a tool detachably retained on each said hammers and projecting axially beyond the free end of said chamber, a shroud attached to the free end of said chamber, said shroud extending radially from said chamber a distance approximately equal to the diameter of the path generated by said tools upon rotation of said chamber and tube and extending forwardly from said chamber a distance approximately equal to the maximum projection of said tools, the forward extending portion of said shroud having a notch therein opposite each of said tools and a peripheral portion of each of said tools protruding radially beyond said shroud a respective one of said notches.

7. A tunneling machine comprising a vehicular frame, motor means for advancing and retracting said vehicular frame, a carrier frame having a work head rotatably mounted thereon, mounting means on said vehicular frame for supporting said carrier frame, said work head having a plurality of impact hammers secured around the exterior thereof and extending parallel with the axis of work head rotation, an impact cutting tool mounted in each of said hammers for operation in the axial direction thereof, said work head comprising a hollow central portion providing a chamber opening forwardly adjacent said cutting tools, suction means attached to and communicating with said hollow central portion, means for rotating said work head, and means on said vehicular frame for traversing said work head laterally in directions normal to the axis of work head rotation while maintaining the work head axis parallel with the longitudinal center line of the vehicular frame.

8. A tunneling machine comprising, a vehicular frame, motor means for advancing and retracting said vehicular frame, a carrier frame, a universally shiftable mounting means on said vehicular frame for supporting said carrier frame, a tubular member mounted for rotation on said carrier frame, an enlarged hollow axially extending chamber member mounted on the forward end of said tubular member, motor means on said carrier frame for rotating said tubular member, a plurality of impact hammers mounted on the exterior of said hollow chamber member and arranged in a generally circular pattern, an impact cutting tool detachably carried in each of said hammers, said hollow chamber opening forwardly adjacent said cutting tools, suction means connected to said tubular member for causing air to flow across the cutting faces of said tools and then into said chamber member, and means on said vehicular frame for shifting said work head laterally in directions normal to the axis of work head rotation while maintaining the work head axis substantially parallel with the longitudinal center line of said vehicular frame.

9. A tunneling machine according to claim 8 and further comprising, a shroud of less diameter than the cutting circle of said tools secured to said chamber member and extending forwardly of said hammers to substantially surround said tools for restricting the air flow into said chamber to a path substantially in the plane of the impacting surfaces of said tools.

10. A tunneling machine according to claim 9 and further comprising a baffle plate secured in the forward open end of said chamber member transversely of the axis thereof, said plate having a size such that the remaining open area of said chamber member is substantially equal to the cross-sectional area of said tubular member.

References Cited by the Examiner
UNITED STATES PATENTS

| | | | |
|---|---|---|---|
| 836,494 | 11/1906 | Frieh et al. | 175—96 |
| 1,404,929 | 1/1922 | Collins | 299—62 |
| 1,461,713 | 7/1923 | Gilman et al. | 175—96 |
| 2,528,748 | 11/1950 | Greene | 299—56 |
| 2,821,374 | 1/1958 | Gardner | 299—56 |

ERNEST R. PURSER, *Primary Examiner.*